(12) United States Patent
Ohnishi

(10) Patent No.: US 7,200,165 B2
(45) Date of Patent: Apr. 3, 2007

(54) CELL SEARCH METHOD TO SUBTRACT AUTOCORRELATION PATTERNS FROM A CORRELATION VALUE PROFILE

(75) Inventor: Osamu Ohnishi, Tokyo (JP)

(73) Assignee: NEC Electronics Corporation, Kanagawa (JP)

( * ) Notice: Subject to any disclaimer, the term of this patent is extended or adjusted under 35 U.S.C. 154(b) by 909 days.

(21) Appl. No.: 10/014,095

(22) Filed: Dec. 11, 2001

(65) Prior Publication Data

US 2002/0110185 A1 Aug. 15, 2002

(30) Foreign Application Priority Data

Dec. 15, 2000 (JP) ............................ 2000-382145

(51) Int. Cl.
*H04B 1/00* (2006.01)
*H04B 1/707* (2006.01)
*H04Q 7/20* (2006.01)

(52) U.S. Cl. ...................... 375/150; 455/525

(58) Field of Classification Search ............... 375/150, 375/142, 350, 343, 200, 144, 148; 370/342, 370/335, 441; 455/422.1, 436, 501, 456.6, 455/517, 524, 525
See application file for complete search history.

(56) References Cited

U.S. PATENT DOCUMENTS

| 4,875,188 A | | 10/1989 | Jungroth | |
|---|---|---|---|---|
| 5,319,370 A | | 6/1994 | Signore et al. | |
| 5,392,236 A | | 2/1995 | Hashimoto | |
| 5,577,022 A | * | 11/1996 | Padovani et al. | ............ 370/332 |
| 5,579,262 A | | 11/1996 | Song | |
| 5,710,768 A | * | 1/1998 | Ziv et al. | ...................... 370/342 |
| 5,910,948 A | * | 6/1999 | Shou et al. | .................. 370/335 |
| 6,064,690 A | * | 5/2000 | Zhou et al. | .................. 375/142 |
| 6,370,134 B1 | * | 4/2002 | Aramaki | ...................... 370/342 |
| 6,480,558 B1 | * | 11/2002 | Ottosson et al. | ............ 375/350 |

(Continued)

FOREIGN PATENT DOCUMENTS

EP 0 795 971 A2 9/1997

(Continued)

OTHER PUBLICATIONS

Hanada et al., "Experiments on Target Cell Search Time during Active Mode Using 3-step Cell Search Method in W-CDMA Mobile Radio", Technical Reports of the Proceedings of the Institute of Electronics, Information, and Communication Engineers (IEICE), RCS (Radio Communications Systems) 99-154, 1999-11) pp. 91-97.

*Primary Examiner*—Betsy L. Deppe
(74) *Attorney, Agent, or Firm*—Scully, Scott, Murphy & Presser, P.C.

(57) ABSTRACT

A cell search method is disclosed in which autocorrelation patterns are subtracted from a correlation value profile. When carrying out a cell search with respect to a correlation value profile, the peak timing of a first base station is first detected and the scrambling code of this base station is identified. A path search process is then carried out using this timing and scrambling code to detect timings at which multipath occur. Autocorrelation patterns that center on the obtained frame timings and autocorrelation patterns that center on multipath are next generated and a process is performed to subtract these autocorrelation patterns from the correlation value profile. This process enables the rapid detection of peak produced by a second base station.

39 Claims, 13 Drawing Sheets

U.S. PATENT DOCUMENTS

| | | | |
|---|---|---|---|
| 6,563,812 B1 * | 5/2003 | De | 370/342 |
| 6,567,482 B1 * | 5/2003 | Popovic' | 375/343 |
| 6,721,350 B2 * | 4/2004 | Lomp | 375/130 |
| 6,829,291 B1 * | 12/2004 | Imaizumi | 375/150 |
| 6,839,378 B1 * | 1/2005 | Sourour et al. | 375/142 |

FOREIGN PATENT DOCUMENTS

| | | |
|---|---|---|
| EP | 0 825 737 A1 | 2/1998 |
| EP | 0 838 910 A2 | 4/1998 |
| JP | 10-336072 | 12/1998 |
| JP | 2000-278177 | 10/2000 |
| JP | 2000-307470 | 11/2000 |
| JP | 2001-217747 | 8/2001 |
| WO | WO 0064065 * | 10/2000 |

* cited by examiner

CELL SEARCH METHOD TO SUBTRACT AUTOCORRELATION PATTERNS FROM A CORRELATION VALUE PROFILE

BACKGROUND OF THE INVENTION

1. Field of the Invention

The present invention relates to a cell search device and method for enabling a mobile station that uses a W-CDMA communication method to perform a base station search to identify spreading timings of a plurality of base stations located in a vicinity of the mobile station and spreading codes used by the base stations and differing for each base station.

2. Description of the Related Art

In recent years, spread-spectrum communication, which is relatively invulnerable to interference and disturbance, has received considerable attention as a communication method for use in a mobile communication system. This spread-spectrum communication is a communication system in which information signals to be transmitted are spread by means of a spreading code on the transmitting side and then transmitted. On the receiving side, de-spreading is carried out using the same spreading code as the spreading code to obtain the original information signals. The information signals to be transferred as information are referred to as symbols, and a unit of data that constitutes the spreading code for spreading these symbols is referred to as a chip.

In the spread spectrum communication system, a plurality of transmitters perform spreading by using different spreading codes having orthogonality, and a receiver selects the spreading code used when performing de-spreading, to thereby specify each communication. As a result, code division multiple access (CDMA) can be realized in which a plurality of communications use the same frequency band.

In the transmitting/receiving system of the spread spectrum communication method, however, de-spreading cannot be performed properly if the spread timing, which is the timing for performing spreading on the transmitting side, cannot be accurately obtained on the receiving side. For example, if even one chip of this spreading timing diverges, none of the signals that have been transmitted from the transmitting side can be received on the receiving side. As a result, a synchronization acquisition device is provided in a receiver in the CDMA communication method for obtaining the spreading timing of the transmitting side.

In addition, the use of the CDMA communication as a mobile communication system enables one mobile station to communicate with a plurality of base stations at the same time. When, for example, a mobile station is moving rapidly, base stations in the vicinity must be located in a short time in order to switch the base stations that complete a connection. A mobile station in a CDMA communication system must therefore not only search for one base station for current communication, but must also search for other base stations that are located in the vicinity. This process of searching for a plurality of base stations that are located in the vicinity is referred to as a cell search.

In the W-CDMA (Wide band-CDMA) communication method that is adopted in IMT-2000, which is the communication system of the next generation of portable telephones, an inter-base station asynchronous system is adopted in which signals are transmitted between each of the base stations without establishing synchronization. As a result, a process for searching for the spreading timing, which is a different timing for each base station, must be performed as the cell search on the receiving side in the W-CDMA communication method. As an example, a hierarchical cell search method in a spread-spectrum communication method is described in the Technical Reports of the Proceedings of the Institute of Electronics, Information, and Communication Engineers (IEICE), RCS (Radio Communications Systems) 99–154, 1999-11).

The downlink physical channel format that is handled in a cell search in a W-CDMA communication method is next described with reference to FIG. 1.

In the W-CDMA communication method, transmitted data are made up of units of 10-msec frames. These frames are in turn made up of 15 slots. The symbol rate per slot is 10 in the three types of physical channels that are used in a cell search: SCH (Synchronization Channel), CPICH (Common Pilot Channel), and P-CCPCH (Primary Common Control Physical Channel). All ten symbols are separately assigned for the CPICH. For SCH and P-PCCPCH, on the other hand, the space of the first symbol space of 10 symbols is assigned to SCH, and the remaining space of 9 symbols is assigned to P-CCPCH. Because this explanation is in regard to W-CDMA, explanation is given for a case in which one logic symbol bit is spread to 256 chips.

SCH is made up of a combination of p-SCH (primary SCH) and s-SCH (secondary SCH). Of these, p-SCH is stipulated in International 3GPP 25.213 "Spreading and modulation (FDD)" V3.3.0 to be spread by a Primary Synchronization Code (PSC), which is a spreading code used in common by all base stations and all slots. Channels other than p-SCH are not spread by PSC, and accordingly, performing de-spreading by PSC upon signals from a base station causes only p-SCH to appear as the original symbols. A cell search device takes advantage of this feature to detect the spreading timing. CPICH and P-CCPCH are spread by scrambling codes, which are spreading codes that differ for each base station, and therefore cannot be decoded without identifying the scrambling code of the base station that transmitted the received signals.

An example of the construction of a CDMA receiver that is provided with this type of cell search device is shown in FIG. 2. In an actual W-CDMA method, signals that are downlink from a base station undergo orthogonal modulation, but an explanation regarding the functions for orthogonal demodulation will be omitted in the interest of simplifying this explanation.

This CDMA receiver includes RF unit 1, A/D converter 2, correlator 3, and cell search device 94.

RF unit 1 demodulates signals that have been received from a transmitter and converts the signals to baseband signals. A/D converter 2 performs A/D conversion of the baseband signals that have been demodulated by RF unit 1 to convert the signals to digital data. Correlator 3 finds correlation values between the digital data that have been output from A/D converter 2 and predetermined spreading codes. As for the actual construction of correlator 3, in some cases a matched filter is used that holds spreading code length portions of digital data and simultaneously makes correlations with the spreading code, and in other cases a correlator bank is used that makes successive correlations between the spreading code and the digital data and accumulates these correlations.

As shown in FIG. 3, cell search device 94 is made up of averaging processor 41 and peak detector 43.

Averaging processor 41 performs an averaging process by averaging a correlation value profile from correlator 3 a fixed number of times for each timing. Peak detector 43 successively detects the peak values of the correlation value profile that has undergone the averaging process by averaging processor 41 and the peak timings at which the peak values have been obtained FIG. 4 shows an example of correlation values for each timing obtained by correlator 3. In FIG. 4, actual data of the correlation values of the 10240 timings in the space of one slot are shown as an artificially created graph for the purpose of explanation.

In the W-CDMA method, quadruple oversampling is normally performed when calculating correlation values. In this case, the spreading length of PSC is 256 chips, the number of symbols per time slot is 10, and the number of timings, which is the amount of data of the space of one slot, is 4 (quadruple sampling)×256 (chips)×10 (symbols) =10240.

Cases in which correlation values indicate high values are those times when the timings of PSC and SCH coincide, and this graph includes a plurality of such timings. These cases indicate that the mobile station is receiving waves from a plurality of base stations.

This case shows correlation value data in the space of one slot, but in a mobile communication system that is made up of a mobile station and a plurality of base stations, correlation values will fluctuate widely due to the influence of such factors as fading because the mobile station communicates with base stations while moving. At times of a high degree of fading, the obtained correlation values will drop drastically, giving the impression that no waves are being received from the base station.

In order to overcome this type of problem, a slot averaging process is performed by averaging processor 41 in which the average of the correlation value data for the space of each slot is calculated instead of detecting the spreading timing based on the data of a single correlation value, thus preventing malfunctioning that is caused by loss of data due to fading.

Referring now to the flow chart of FIG. 5, a cell search process by cell search device 94 of the prior art is next explained.

First, in step 101, correlator 3 calculates a correlation value profile and an averaging process is carried out in averaging processor 41.

The peak value in the correlation value profile and the peak timing are next detected by peak detector 43 to detect the slot timing in step 102. Then, in step 103, this slot timing is used in the processes of detecting frame timing, identifying the code group, and identifying the scrambling code. Although the identification of scrambling code requires various processing steps, these processes will not be described here because they are not directly related to the present invention.

In step 104, a decoding process is carried out using the obtained scrambling code. In the decoding process, a CRC (Cyclic Redundancy Code) check is performed, and if an OK is obtained in this CRC check, the peak is confirmed to be a peak produced by a base station. If the CRC check results in a "NG," on the other hand, the peak is judged to be the result of some type of noise and not a peak produced by a base station. Upon completion of the search for one base station, the processes of steps 102–104 are repeated to search for a second and third base station.

By carrying out a cell search by the above-described processes, a mobile station can learn the peak timings and scrambling codes of base stations that are located in the vicinity. In actual correlation value profiles that are obtained in the field, however, a variety of noise is generated in addition to the peaks of base stations, including peaks resulting from multipath reception that occur when waves from a base station are reflected from geographical features and buildings, cross-correlation peaks generated with other channels, and autocorrelation peaks generated with the same channel. In the correlation value profile shown in FIG. 4, for example, peak A is a peak caused by a first base station #1 and peak D is a peak caused by a second base station #2, but the other peaks are the result of these types of noise. If a cell search is performed using this correlation value profile, a judging process is carried out to determine whether or not each peak is a base station peak starting from the largest correlation value, with the result that a judging process is carried out to determine whether or not peaks A, B, C, and D are base stations in that order. However, since peaks B and C in FIG. 4 are actually the result of some type of noise and not peaks caused by base stations, the CRC check in the decoding process results in NG and these peaks are determined to be noise.

However, since these peaks cannot be determined to be noise until after the decoding process and CRC check, the judging process to determine whether or not a peak is produced by a base station must be performed for peaks that are caused by noise, and the time required for a cell search is consequently lengthened. Lengthening of the time required for a cell search leads to an increase in power consumption.

In the above-described cell search device of the prior art, the search for base stations is carried out based only on the size of peak values, and as a result, a judging process to determine whether or not a peak is caused by a base station must be performed even for noise such as multipath reception and autocorrelation peaks, and the prior art device therefore suffers from the problem that a cell search requires a long time to search for a fixed number of base stations.

SUMMARY OF THE INVENTION

It is an object of the present invention to provide a cell search device and method that can eliminate unnecessary processes such as judging processes for determining whether or not noise resulting from multipath reception or autocorrelation peaks is a base station, thereby shortening the time for a cell search.

To achieve the above-described object, a cell search method according to the first aspect of the present invention includes steps of: determining correlation values between received signals and a spreading code shared among base stations to determine a correlation value profile; detecting peak values from said correlation value profile and peak timings at the time the peak values have been obtained to detect spreading timings of base stations; identifying spreading codes that differ for each base station and that are used by base stations for which spreading timings have been detected; performing a path search process using the detected spreading timings and the spreading codes that differ for each base station and that have been identified to detect peak timings at the time multipath occurs; generating an autocorrelation pattern with the center at the obtained spreading timing of a base station and autocorrelation patterns with the center at the peak timings at the time multipath occurs, based on an autocorrelation pattern that has been found in advance from said spreading code shared among base stations; subtracting each of said generated autocorrelation patterns from said correlation value profile; and searching for a next base station from the correlation value profile that has undergone said subtraction.

When searching for base stations according to the present invention, a search for a next base station is carried out after subtracting, from the correlation value profile, autocorrelation patterns of base stations for which searches have already been and autocorrelation patterns of multipath reception. This method allows the elimination of unnecessary processes such as judging whether or not noise such as multipath reception or autocorrelation peaks is a base station, and as a result, enables a shortening of the time for the cell search. As a result, not only can power consumption be cut but the possibility of misjudging noise to be a base station can be reduced.

According to an embodiment of the present invention, a search for a next base station is done after subtracting from the correlation value profile: only autocorrelation patterns of base stations searches have already been conducted for, only multipath autocorrelation patterns, only peak values of multipath reception, or only autocorrelation patterns of base stations searches have already been conducted for and multipath peak values.

According to another aspect of the present invention, a cell search method includes steps of: detecting correlation values between received signals and a spreading code shared among base stations to determine a correlation value profile; detecting peak values from this correlation value profile and the peak timings at which the peak values have been obtained to detect the spreading timings of base stations; identifying spreading codes that differ for each base station and that are used by base stations for which spreading timings have been detected; performing a path search using detected spreading timings and identified spreading codes that differ for each base station to detect peak timings at which multipath reception occurs; subjecting the above-described correlation value profile to a masking process that eliminates as targets of a cell search the timings of autocorrelation patterns that center on the detected spreading timings and the timings of autocorrelation patterns with the center at a peak timings at which multipath reception occurs; and then performing a search for the next base station from the correlation value profile that has undergone the masking process.

When searching for base stations according to the present invention, a search for a next base station is carried out after subjecting the correlation value profile to a process of masking the timings of autocorrelation patterns of base stations searches have already been conducted for and the timings of autocorrelation patterns of multipath reception. As a result, unnecessary processes such as processes of judging whether or not noise resulting from multipath reception and autocorrelation peaks is a base station can be eliminated, and the time for a cell search can be shortened. The present invention therefore not only can reduce power consumption but also can reduce the possibility of misjudging noise to be a base station.

According to an embodiment of the present invention, a search for a next base station is conducted after subtracting from the correlation value profiles: only autocorrelation patterns of base stations searches have already been conducted for, only autocorrelation patterns of multipath reception, only peak values of multipath reception, and only autocorrelation patterns of base stations searches have already been conducted for and multipath peak values.

The above and other objects, features, and advantages of the present invention will become apparent from the following description with reference to the accompanying drawings, which illustrate examples of the present invention.

BRIEF DESCRIPTION OF THE DRAWINGS

FIG. 9d shows a correlation value profile following subtraction of the autocorrelation pattern that is shown in FIG. 9c from the correlation value profile that is shown in FIG. 9a;

DETAILED DESCRIPTION OF THE PREFERRED EMBODIMENTS

Before explaining each of the embodiments, an explanation is first presented regarding an autocorrelation pattern.

In a cell search, slot timing is first detected using a p-SCH (Synchronization Channel) that includes signals that have been spread by a PSC (Primary Synchronization Code) that is common to all base stations. Then frame timing is next detected using s-SCH. In a W-CDMA communication method, the PSC is established by the 3GPP (Third Generation Partnership Project), which is a standardizing project that is investigating international standards for third-generation mobile communication systems. This PSC is a 256-chip spreading code having the 16×16 hierarchical structure that appears in the following formula, this code being the same in the SCH of all base stations and all slots.

$$y = a \times x = <a,a,a,\bar{a},\bar{a},a,\bar{a},\bar{a},a,a,a,\bar{a},a,\bar{a},a,a>$$

a={0, 0, 0, 0, 0, 0, 1, 1, 0, 1, 0, 1, 0, 1, 1, 0}
x={0, 0, 0, 1, 1, 0, 1, 1, 0, 0, 0, 1, 0, 1, 0, 0} where the spreading code notation by binary numbers (0, 1) corresponds to actual spreading code (1, −1).

Because the PSC is of a 16×16 hierarchical structure, the de-spreading process that uses this PSC can also process by dividing into two tiers of 16×16. Thus, in a case in which de-spreading is carried out using a matched filter, de-spreading can be realized with a circuit structure of smaller scale than a case of processing 256 chips all at once.

If two spreading codes have ideal orthogonality, the result of calculating correlation values between the two spreading codes will produce low values. Thus, if two identical spreading codes are shifted by just one chip and correlation values then found, under ideal conditions, the correlation values will be low. Spreading codes that are of completely random structure typically have high orthogonality, but due to the above-described hierarchical structure of the PSC, even in a case of finding the correlation value between two PSC of shifted timings, the correlation value that is obtained at a specific timing will be rather high and the obtained correlation values will not fall to 0. The peaks of these correlation values are referred to as autocorrelations peaks. In addition, the pattern of these correlation values is referred to as an autocorrelation pattern, and if the PSC is specified, the autocorrelation pattern will also be a set pattern.

Figure 6:
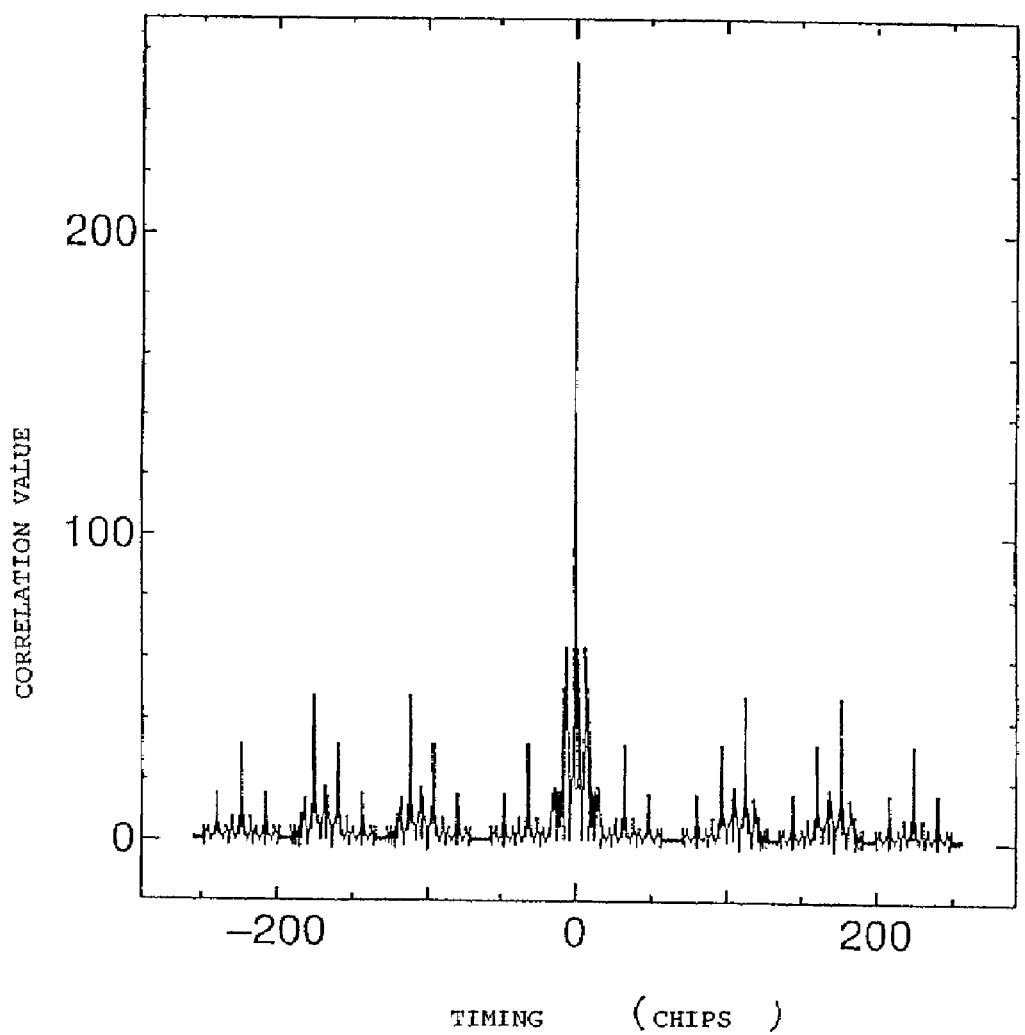
FIG. 6 shows a PSC autocorrelation pattern.

FIG. 6 shows the autocorrelation pattern that is obtained by calculating the correlation values after shifting the timings of two PSC described hereinabove by one chip. The horizontal axis in this figure shows the timing by which the two PS C are shifted. In addition, Table 1 is a table giving only the timings at which high correlation values are obtained in FIG. 6. Referring to Table 1, it can be seen that high correlation values are generated at specific timings.

TABLE 1

| TIMING (CHIPS) | CORRELATION VALUE |
|---|---|
| 0 | 256 |
| ±1 | 17 |
| ±2 | 64 |
| ±3 | 17 |
| ±5 | 17 |
| ±6 | 64 |
| ±7 | 51 |
| ±9 | 51 |
| ±11 | 17 |
| ±13 | 17 |
| ±15 | 17 |
| ±16 | 16 |
| ±32 | 32 |
| ±48 | 16 |
| ±80 | 16 |
| ±96 | 32 |
| ±112 | 48 |
| ±144 | 16 |
| ±160 | 32 |
| ±176 | 48 |
| ±208 | 16 |
| ±224 | 32 |
| ±240 | 16 |

Figure 1:
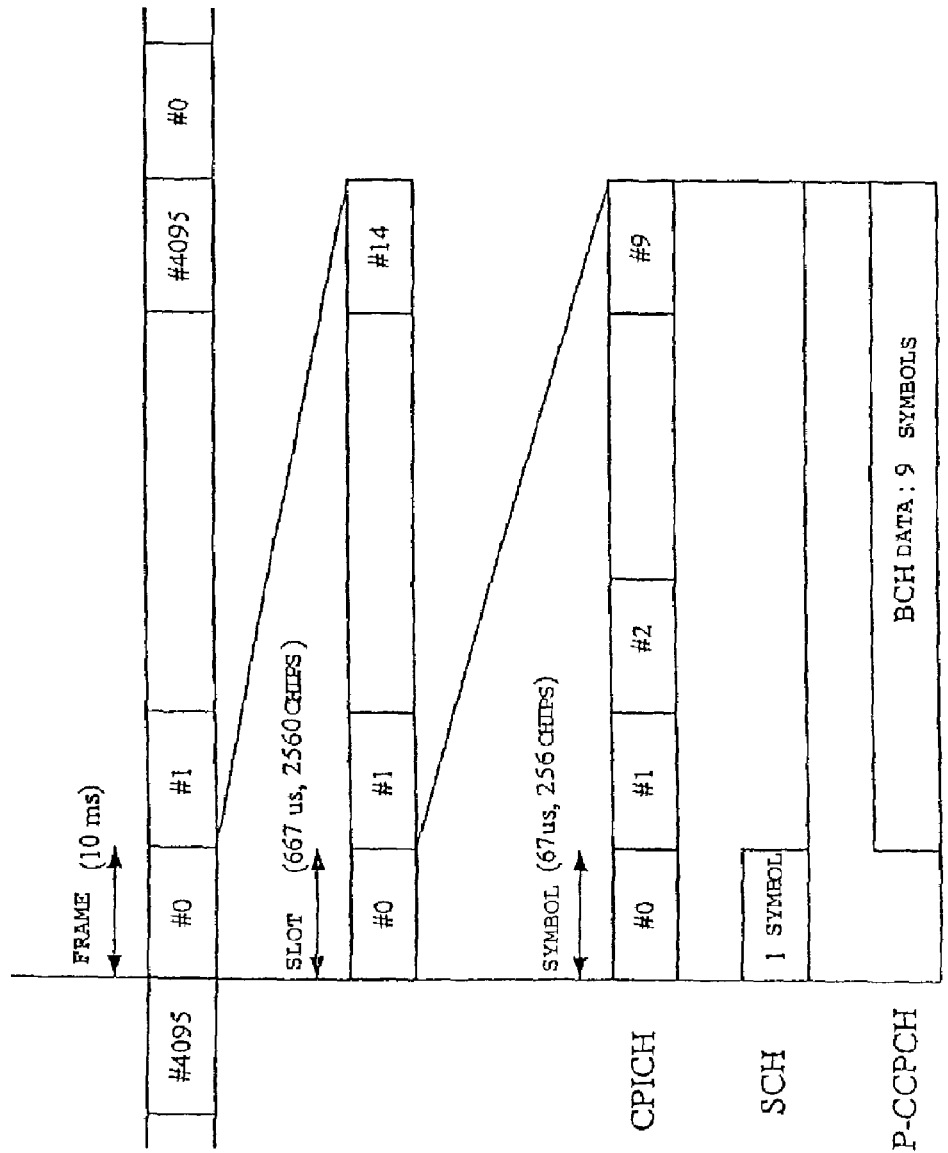
FIG. 1 shows physical channel formats of a downlink channel handled in a cell search in a W-CDMA communication method.
Figure 2:
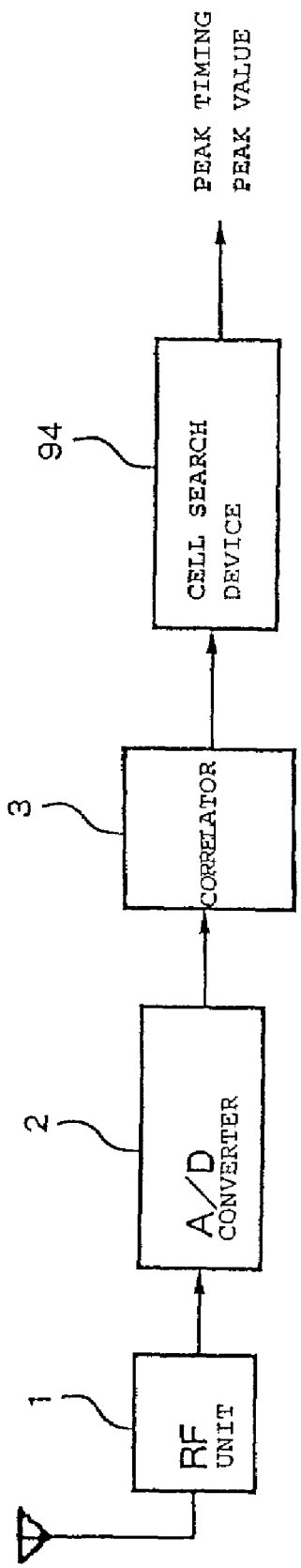
FIG. 2 is a block diagram showing the construction of a DCMA receiver of the prior art.
Figure 3:
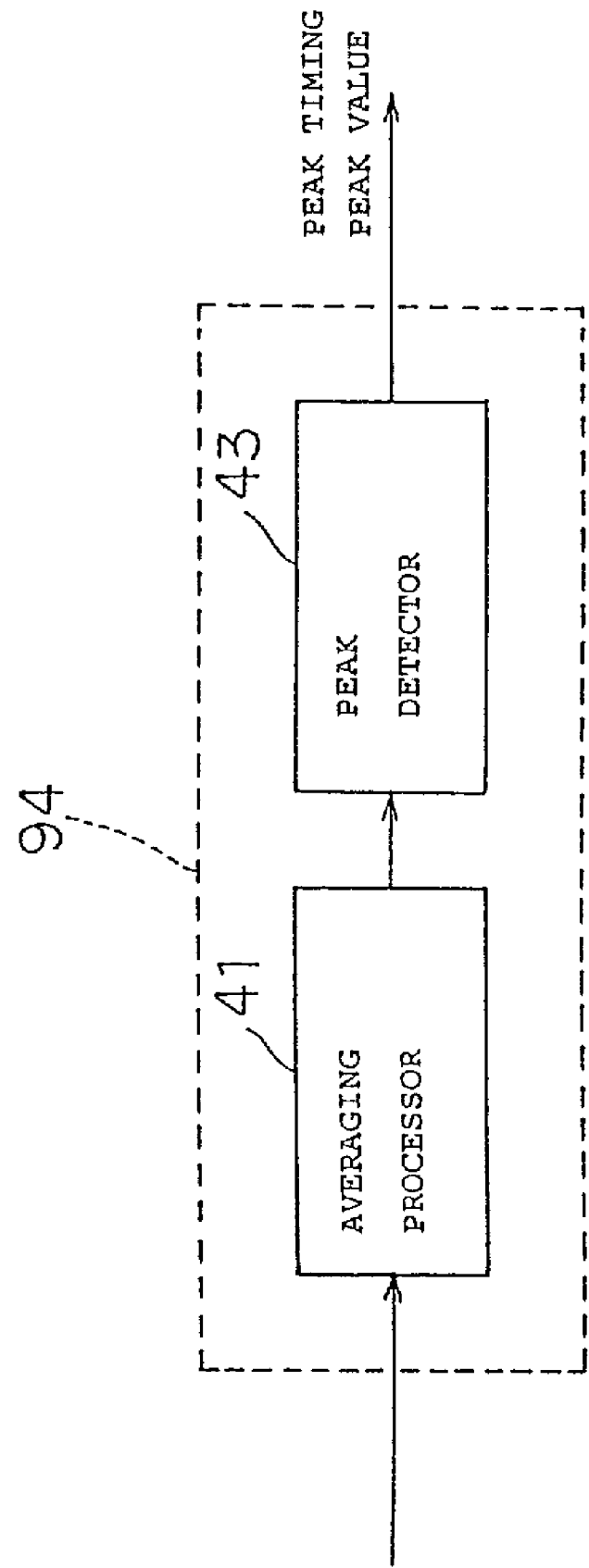
FIG. 3 is a block diagram showing the construction of cell search device 94 of the prior art.
Figure 4:
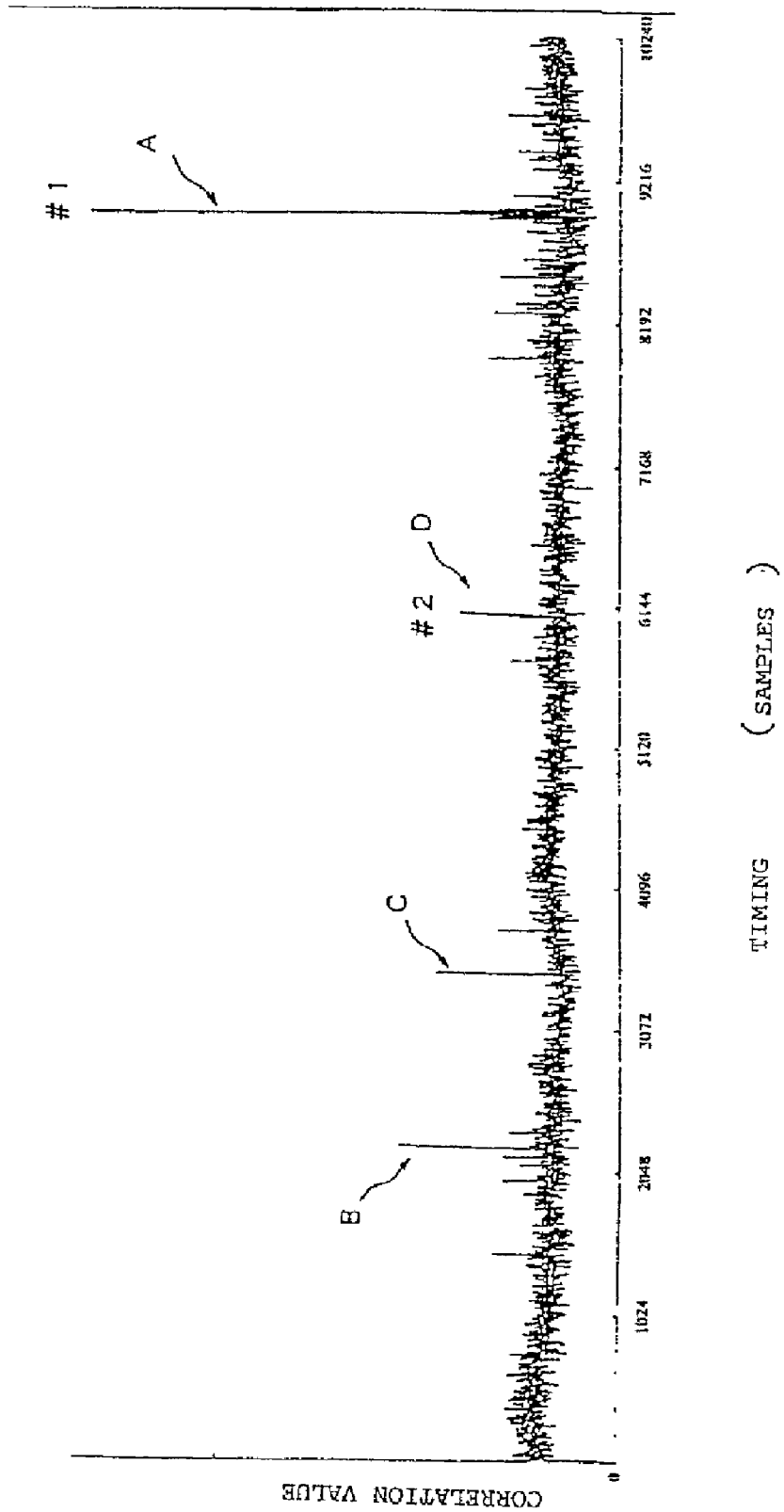
FIG. 4 shows an example of a correlation value profile that is obtained by correlator 3.
Figure 7:
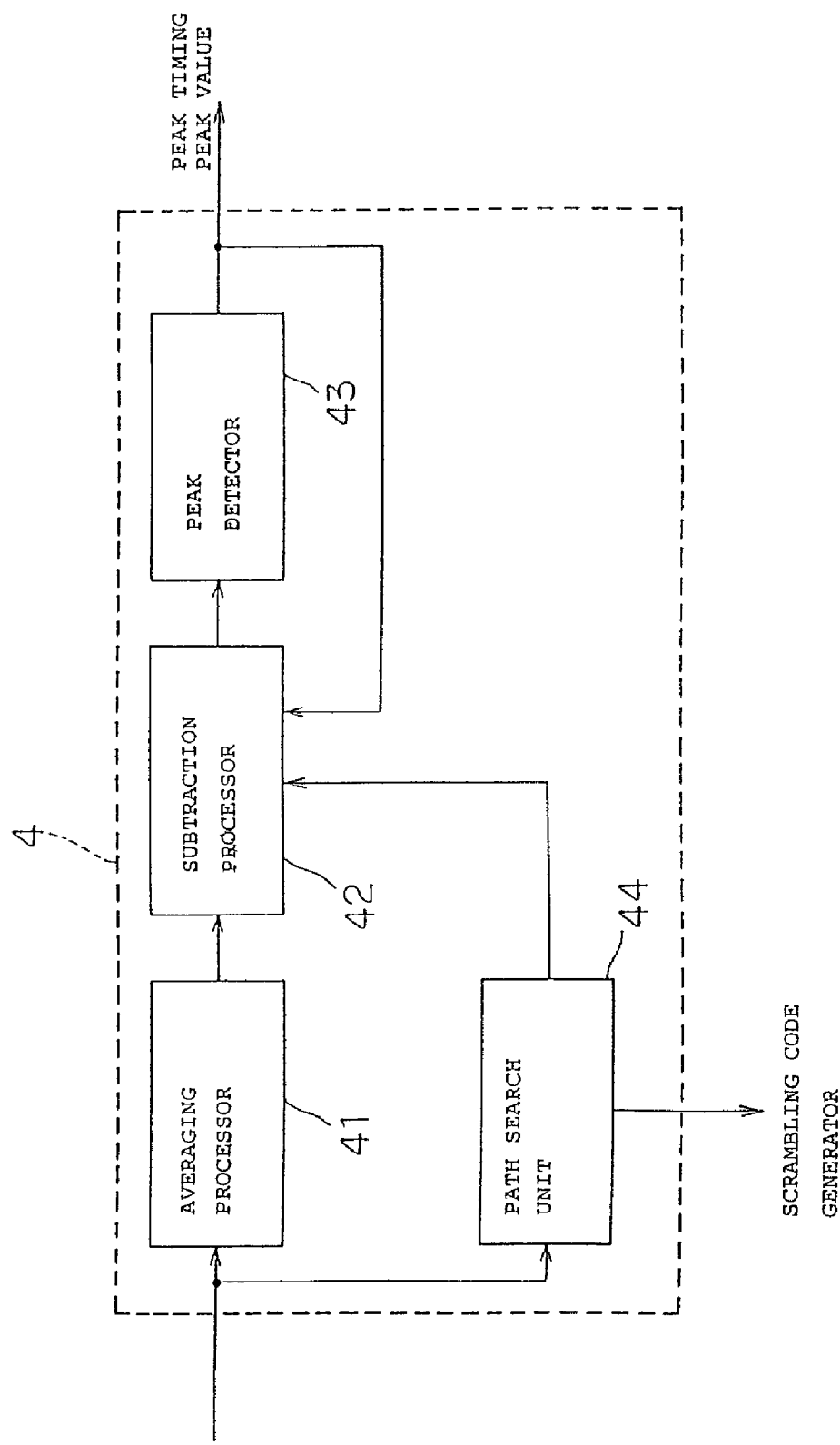
FIG. 7 is a block diagram showing the construction of cell search device 4 according to the first embodiment of the present invention.

First Embodiment:

We refer now to FIG. 7, which is a block diagram showing the construction of cell search device 4 according to the first embodiment of the present invention. In FIG. 7, constituent elements that are identical to constituent elements in FIG. 3 are given the same reference numerals, and redundant explanation is here omitted. In addition, cell search device 4 in the present embodiment is used in the same manner as cell search device 94 in the prior-art CDMA receiver shown in FIG. 2.

Cell search device 4 of this embodiment is made up of averaging processor 41, subtraction processor 42, peak detector 43, and path search unit 44, as shown in FIG. 7.

Path search unit 44 performs a path search process by carrying out CPICH de-spreading of a specified scrambling code using timings that are shifted a set interval before and after the obtained frame timing. Specifically, the timing of the scrambling code that is generated by a scrambling code generator (not shown in the figure) is controlled, and timings at which larger correlations are obtained by correlator 3 are detected as timings at which multipath reception occurs.

Subtraction processor 42 performs a process of subtracting, from the correlation value profile that has been averaged by averaging processor 41: peak timings that have been obtained by peak detector 43 and autocorrelation patterns that center on these peak timings, multipath that has been obtained by path search unit 44, and autocorrelation patterns that center on the multipath timings.

When generating, from an autocorrelation pattern that has been stored in advance, an autocorrelation pattern for carrying out the subtraction process, subtraction processor 42 carries out a normalization process to uniformly correct each correlation value of the autocorrelation pattern that has been stored in advance such that the peak value at the center of a created autocorrelation pattern matches the peak value that has been obtained by peak detector 43. The operation of cell search device 4 of this embodiment is next explained with reference to the flow chart of FIG. 8.

Figure 5:
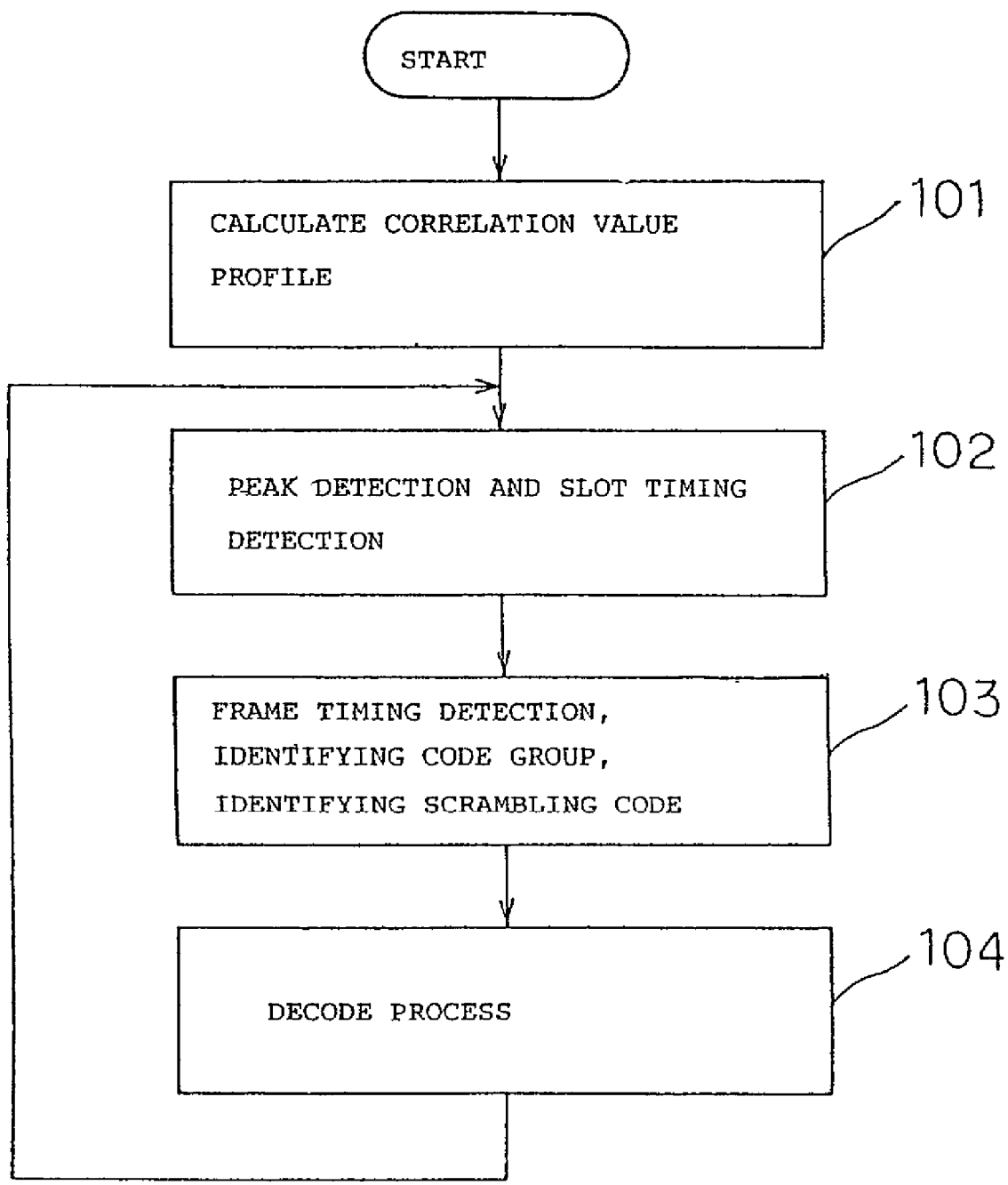
FIG. 5 is a flow chart showing the operation of cell search device 94 of FIG. 3.

Steps 101–104 in this flow chart are identical to the operations of cell search device 94 of the prior art shown in FIG. 5 and redundant explanation is therefore here omitted.

Figure 9A:
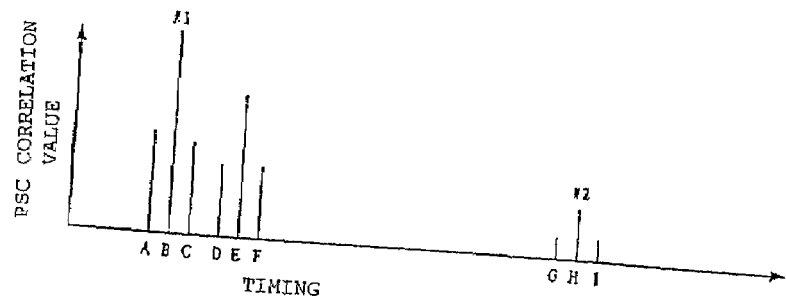
FIG. 9a shows a correlation value profile that is obtained by correlator 3.

The following explanation presumes that a correlation value profile such as shown in FIG. 9a has been obtained by correlator 3. In FIG. 9a, peak B is a peak produced by a first base station, and peak E is an autocorrelation peak caused by multipath of the first base station. Peaks A and C are autocorrelation peaks of the first base station, and peaks D and F are autocorrelation peaks of the multipath of the first base station. Peak H is a peak produced by a second base station, and peaks G and I are autocorrelation peaks produced by multipath of the second base station.

Figure 9B:
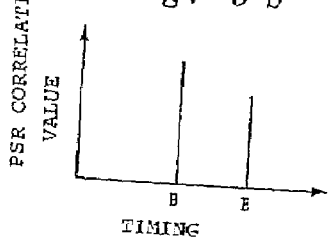
FIG. 9b shows a correlation value pattern that is obtained by a path search (PSR)

First, upon obtaining the peak timing and peak value of the first base station in steps 101–104, a path search process is carried out by path search unit 44 using the identified scrambling code and frame timing in step 105 to detect the timings at the time multipath occurs. In a case in which a correlation value profile such as shown in FIG. 9a is obtained, for example, a pattern such as shown in FIG. 9b is obtained as the correlation value by a path search (PSR). The path search process in step 105 may also precede the decoding process in step 104.

Figure 9C:
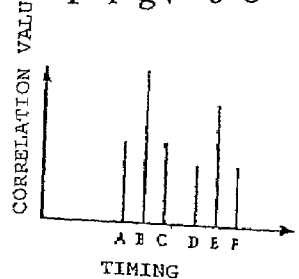
FIG. 9c shows an autocorrelation pattern that centers on frame timings and an autocorrelation pattern of a multipath that is generated by subtraction processor 42.

In step 106, subtraction processor 42 next generates an autocorrelation pattern with the center at the obtained frame timing and an autocorrelation pattern that centers on multipath, as shown in FIG. 9c.

Figure 9D:
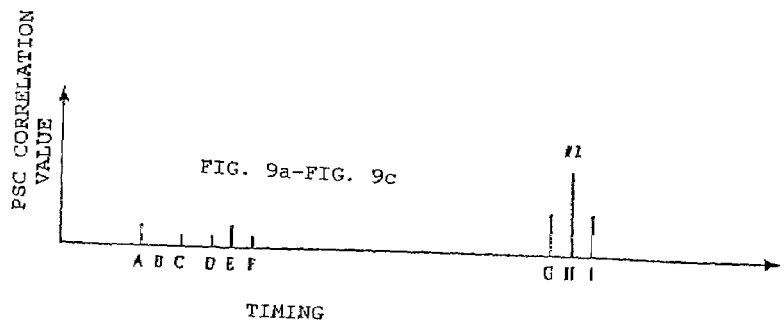

Subtraction processor 42 performs a process of subtracting the autocorrelation patterns shown in FIG. 9c from the correlation value profile shown in FIG. 9a in step 107. By means of this subtraction process, a correlation value profile is produced such as shown in FIG. 9d in which only the peaks caused by the second base station and its autocorrelation pattern remain.

Next, in the processes of steps 102–104, peak H, which is the peak produced by the second base station, is detected, and the detection of the frame timing of the second base station and the identification of the scrambling code are carried out. The processes of steps 105–107 are then repeated in the same way, whereby the peak produced by the second base station, multipath, and the peaks produced by the multipath are subtracted from the correlation value profile, and the search of the third base station is carried out.

According to the cell search method of cell search device 4 of this embodiment, a base station search process is performed for peak H without carrying out the unnecessary processes such as base station search processing for peaks A, C, D, E, and F.

Even if base station search processing were carried out for peaks A, C, D, and F, the CRC check would give a NG result in the decoding process, and the processing would therefore have no benefit. In addition, base station search processing for peak E would only obtain the same result as the base station search processing for peak B and the aim of promptly obtaining information on a plurality of stations would not be achieved.

The pointless processing to determine whether noise such as multipath and autocorrelation peaks is a base station is therefore eliminated in the cell search method of this embodiment, and the time for a cell search can therefore be shortened. As a result, power consumption can be reduced, and additionally, the possibility of mistakenly judging noise to be a base station can be reduced. This embodiment therefore not only allows a highly reliable cell search to be carried out rapidly, but enables prompt handovers and stable communication.

Second Embodiment:

Cell search device 4 of the above-described first embodiment performs a search for a next base station after subtracting from a correlation value profile the autocorrelation peaks of base stations searches have already been conducted for, peaks resulting from multipath, and autocorrelation peaks of multipath. In order to generate an autocorrelation pattern, however, each correlation value of an autocorrelation pattern that has been calculated in advance must undergo a normalization process to adjust at a ratio according to the central correlation value. This process requires a considerable amount of calculation, and the amount of computation for a cell search becomes voluminous when there are many timings at which autocorrelation peaks are to be subtracted.

The present embodiment aims for a result that approximates the first embodiment without requiring a great amount of calculation. According to this embodiment, instead of subtracting from the correlation value profile, timings at which autocorrelation peaks can be predicted to occur are masked so as to eliminate them as targets for a cell search.

Figure 10:
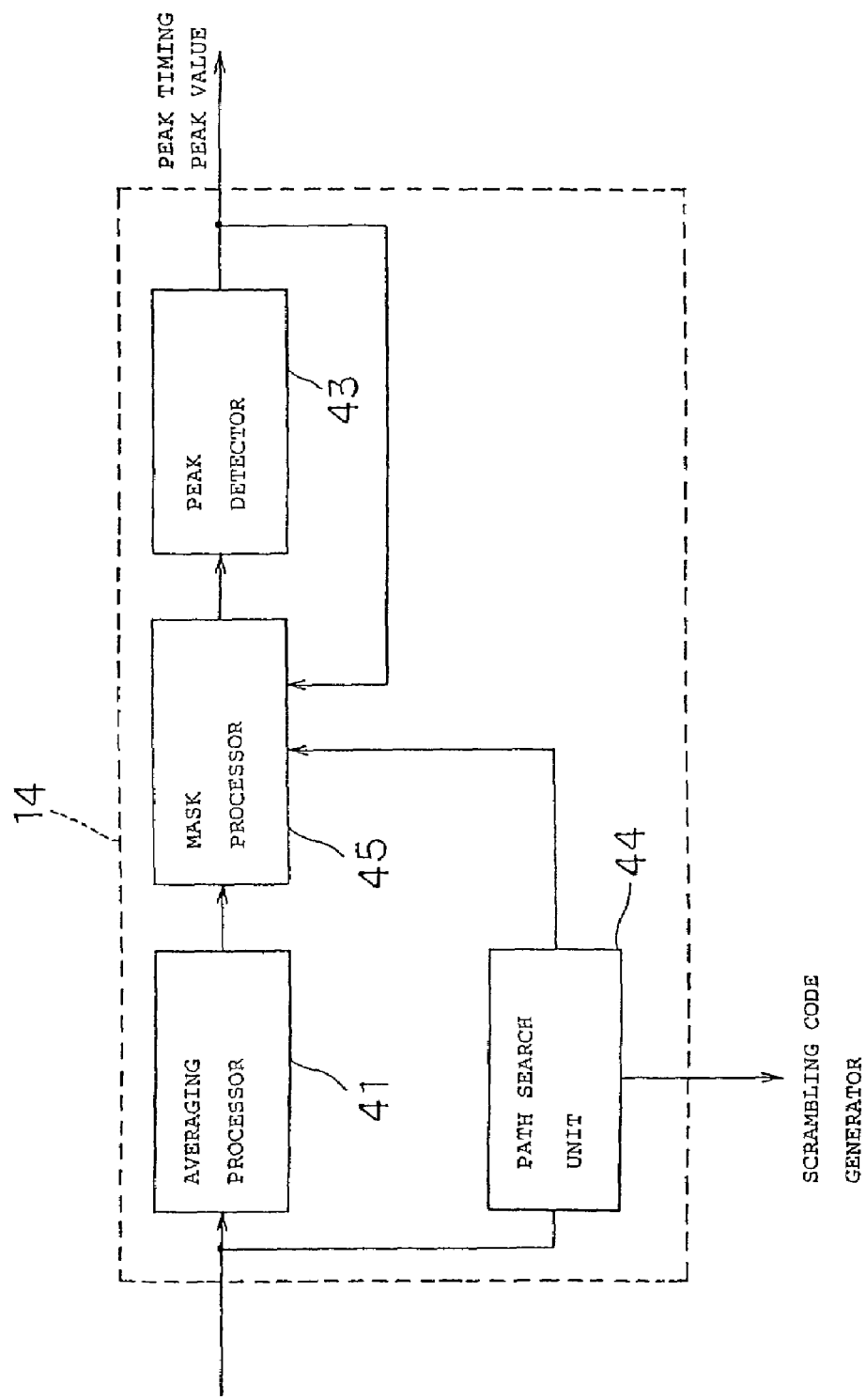
FIG. 10 is a block diagram showing the construction of cell search device 14 according to a second embodiment of the present invention.

FIG. 10 shows the construction of cell search device 14 according to this embodiment. Cell search device 14 of this embodiment is a device in which subtraction processor 42 of cell search device 4 of the first embodiment shown in FIG. 7 is replaced by mask processor 45.

Mask processor 45 masks the correlation value profile that has been averaged by averaging processor 41 such that peak timings obtained by peak detector 43, the timings of autocorrelation patterns that center on these peak timings, the timings of multipath that have been obtained by path search unit 44, and the autocorrelation patterns that center on the timings of multipath are eliminated as targets of a cell search.

Figure 8:
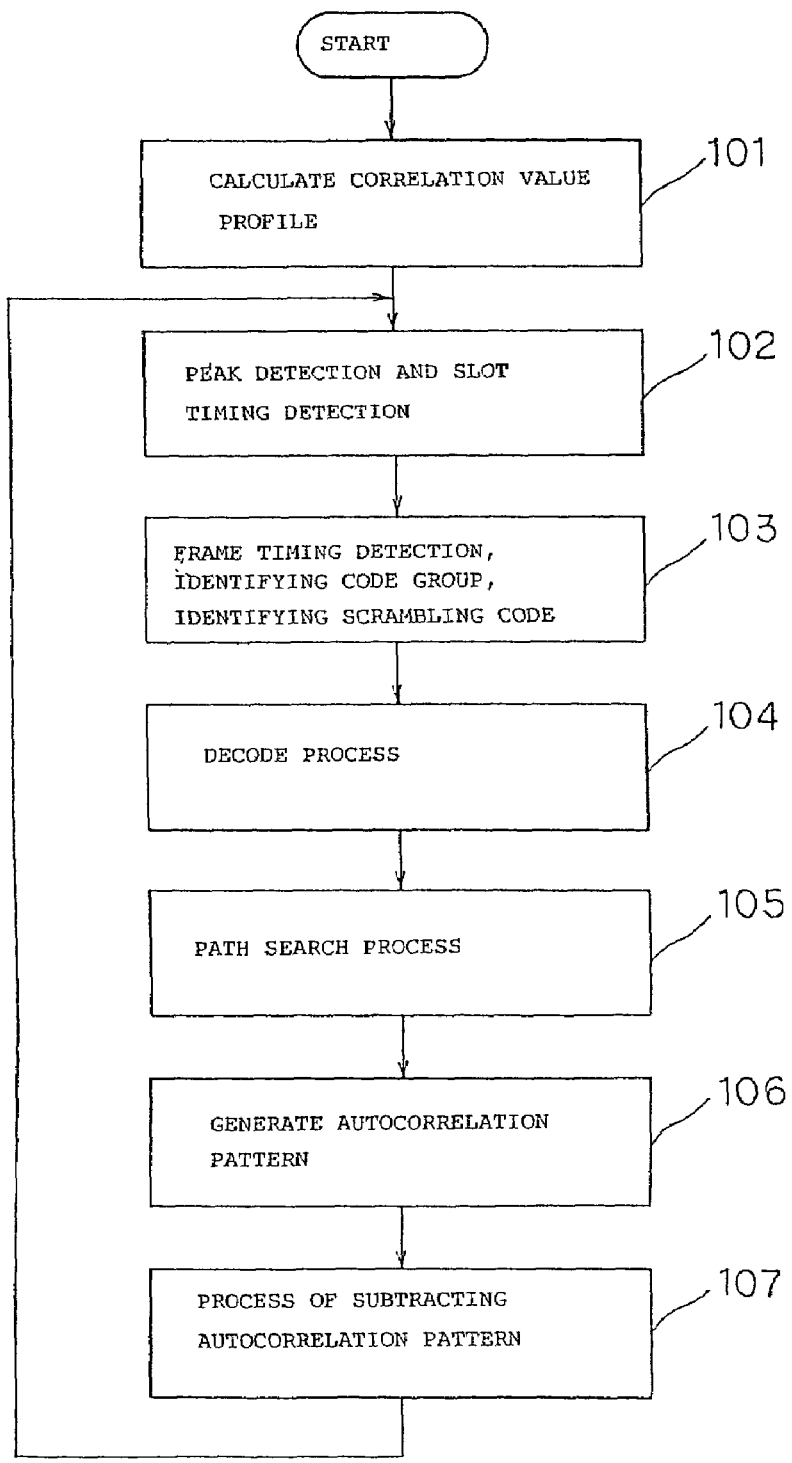
FIG. 8 is a flow chart showing the operation of cell search device 4 of FIG. 7.
Figure 11:
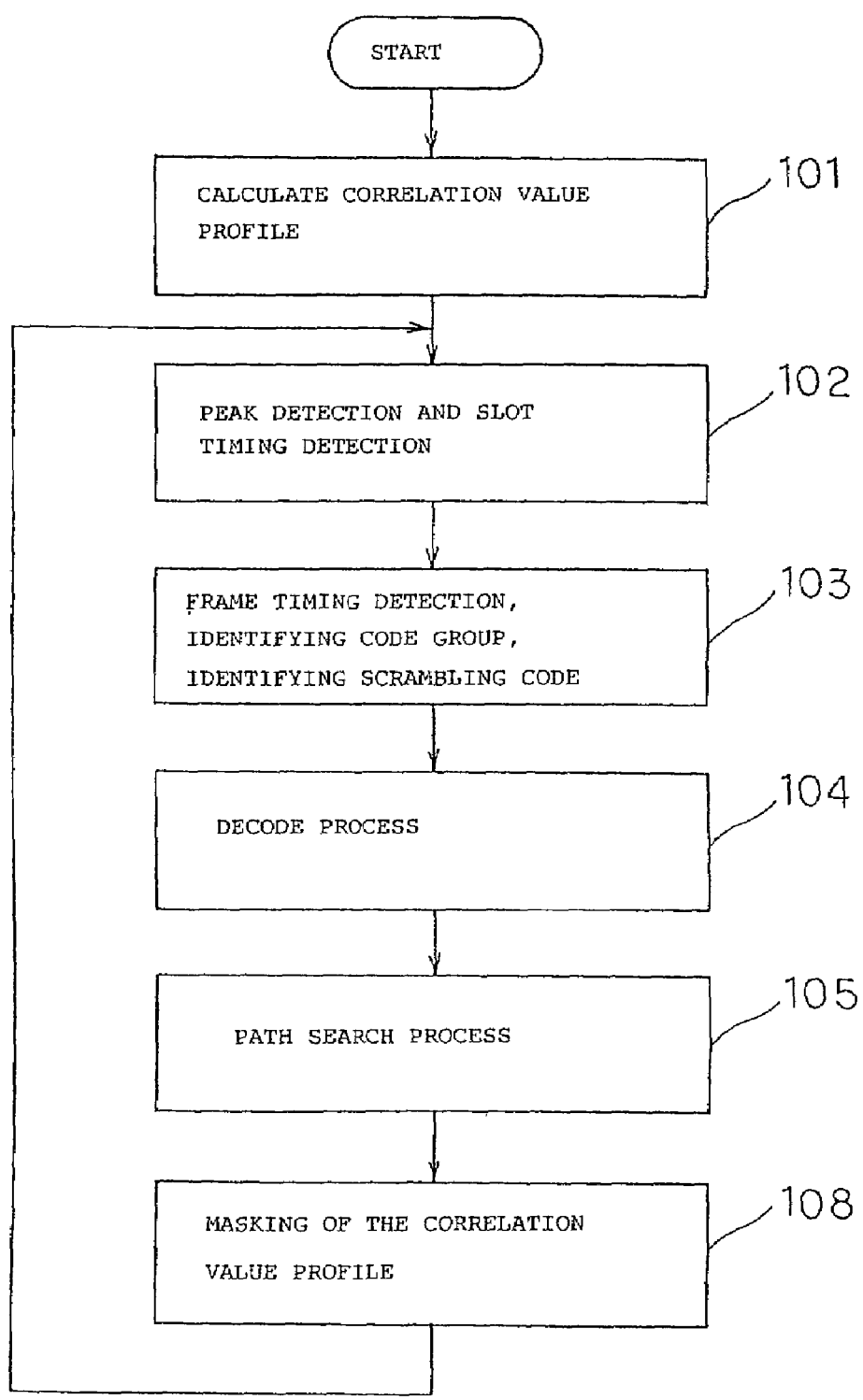
FIG. 11 is a flow chart showing the operation of cell search device 14 of FIG. 10.

FIG. 11 is a flow chart that shows the cell search method realized by cell search device 14 of this embodiment. The cell search method realized by this embodiment is a method in which only steps 106 and 107 shown in the flow chart of FIG. 8 are replaced by step 108.

In step 108, cell search device 14 of this embodiment does not generate an autocorrelation pattern but performs masking of the obtained correlation value profile such that peak timings that have been obtained by peak detector 43, the timings of autocorrelation patterns that center on these peak timings, the timings of multipath that have been obtained by path search unit 44, and the timings of autocorrelation patterns that center on these multipath timings are eliminated as the targets of a cell search.

Figure 12:
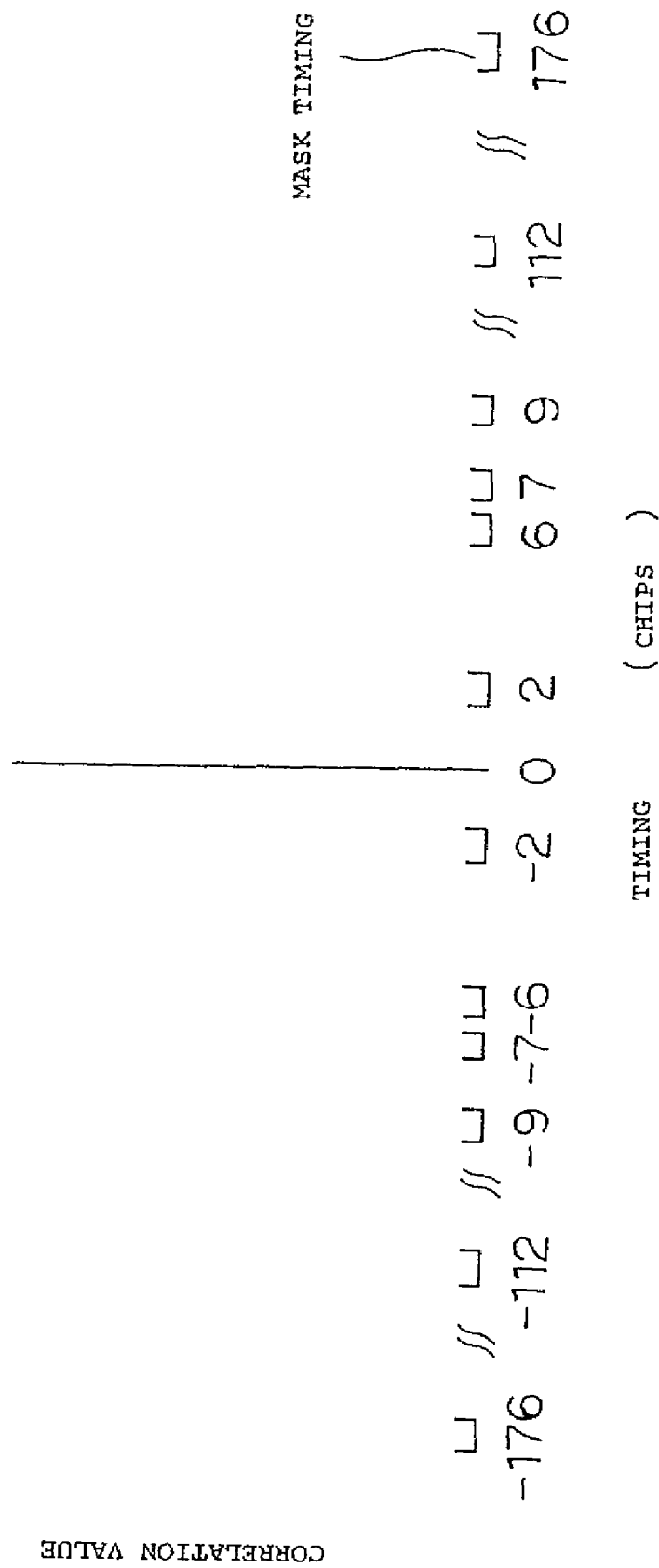
FIG. 12 is for explaining a case of masking in chip units as an example of the masking process method.
Figure 13:
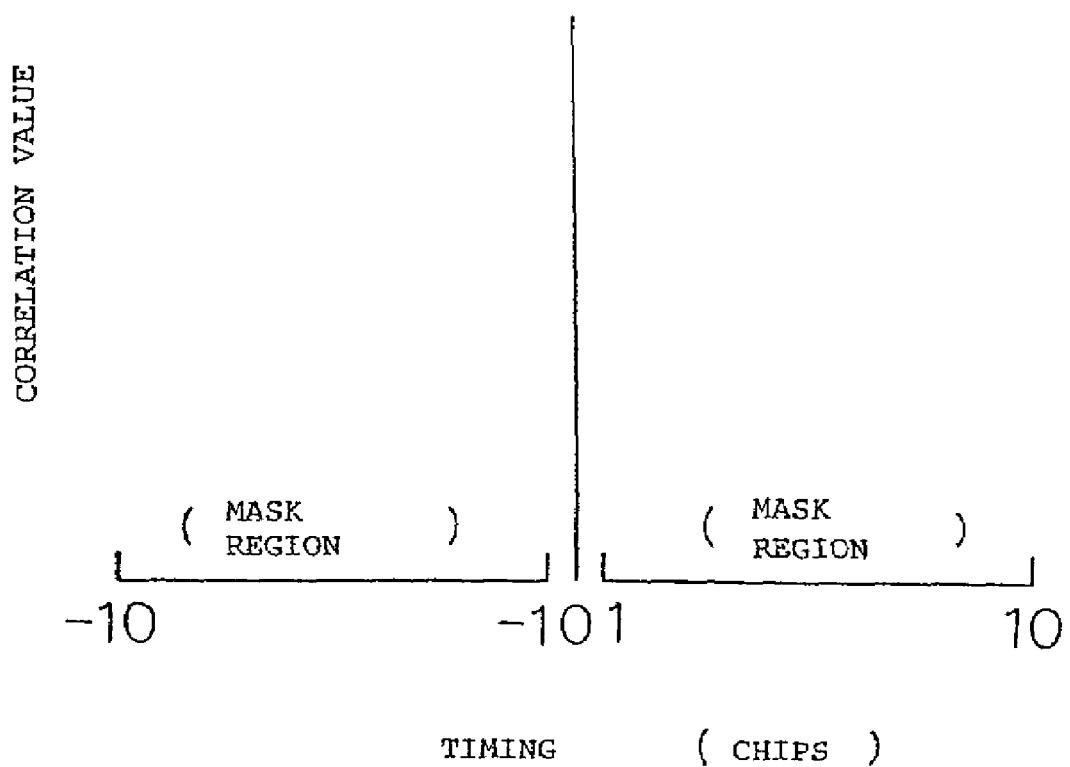
FIG. 13 is for explaining a case of masking only fixed areas as an example of the masking process method.

As the masking process method, the timings of autocorrelation patterns of peak timings of searches for base stations that have already been conducted, the timings of multipath, and the timings of the autocorrelation patterns of the multipath may each be masked in chip units as shown in FIG. 12, or, as shown in FIG. 13, a fixed area of one or a plurality of locations that include the timings at which these peaks attain high correlation values may be masked.

In FIG. 12, the timings that are subject to masking diverge by ±2, 6, 7, 9, 112, and 176 chips from the center, corresponding to Table 1. FIG. 13 shows a case in which range of ±1–10 chips from the center is masked as a fixed area.

As with the first embodiment, this embodiment eliminates pointless processing such as processes for judging whether or not noise such as multipath and autocorrelation peaks is a base station, but realizes this goal with fewer calculations than in the first embodiment, and therefore can shorten the time for a cell search.

In the above-described first and second embodiments, a path search is carried out and a subtraction process or masking process of the correlation value profile is performed using peaks caused by the multipath of base stations for which searches have already been done and the autocorrelation patterns of peaks caused by this multipath. However, the present invention is not limited to these cases, and a form is also possible in which a path search is not carried out and the subtraction process or masking process of the correlation value profile is carried out using only the autocorrelation patterns of base stations for which searches have already been conducted. In addition, the subtraction process or masking process of the correlation value profile may also be realized using only peaks caused by multipath and the autocorrelation patterns of these peaks that are caused by multipath and without using the autocorrelation patterns of peaks that are produced by base stations for which searches have already been done. Still further, the subtraction process or masking process of the correlation value profile may also be carried out using only peaks caused by multipath.

While preferred embodiments of the present invention have been described using specific terms, such description is for illustrative purposes only, and it is to be understood that changes and variations may be made without departing from the spirit or scope of the following claims.

What is claimed is:

1. A cell search method of performing a base station search to identify spreading timings of a plurality of base stations located in the vicinity of a mobile station and spreading codes used by the base stations and differing for each base station, said method comprising steps of:

determining correlation values between received signals and a spreading code shared among base stations to determine a correlation value profile;

detecting peak values from said correlation value profile and peak timings at the time the peak values have been detected to detect spreading timings of base stations;

identifying spreading codes that differ for each base station and that are used by base stations for which spreading timings have been detected;

performing a path search process to detect peak timings at the time multipath occurs using the detected spreading timings and the spreading codes that differ for each base station and that have been identified;

generating an autocorrelation pattern with the center at the detected spreading timing of a base station and autocorrelation patterns with the center at the peak timings at the time multipath occurs, based on an autocorrelation pattern that has been found in advance from said spreading code shared among base stations;

subtracting each of said generated autocorrelation patterns from said correlation value profile; and searching for a next base station from the correlation value profile that has undergone said subtraction.

2. A cell search method of performing a base station search to identify spreading timings of a plurality of base stations located in the vicinity of a mobile station and spreading codes used by the base stations and differing for each base station, said method comprising steps of:

determining correlation values between received signals and a spreading code shared among base stations to determine a correlation value profile;

detecting peak values from said correlation value profile and peak timings at the time the peak values have been detected to detect spreading timings of base stations;

identifying spreading codes that differ for each base station and that are used by base stations for which spreading timings have been detected;

performing a path search process to detect peak timings at the time multipath occurs using the detected spreading timings and the spreading codes that differ for each base station and that have been identified;

generating autocorrelation patterns with the center at the detected spreading timing of a base station based on an autocorrelation pattern that has been found in advance from said spreading code shared among base stations;

subtracting said generated autocorrelation patterns and peak values caused by multipath from said correlation value profile; and searching for a next base station from the correlation value profile that has undergone said subtraction.

3. A cell search method of performing a base station search to identify spreading timings of a plurality of base stations located in the vicinity of a mobile station and spreading codes used by the base stations and differing for each base station, said method comprising steps of:

determining correlation values between received signals and a spreading code shared among base stations to determine a correlation value profile;

detecting peak values from said correlation value profile and peak timings at the time the peak values have been detected to detect spreading timings of base stations;

identifying spreading codes that differ for each base station and that are used by base stations for which spreading timings have been detected;

performing a path search process to detect peak timings at the time multipath occurs using the detected spreading timings and the spreading codes that differ for each base station and that have been identified;

generating autocorrelation patterns with the center at a peak timing at the time multipath occurs, based on an autocorrelation pattern that has been found in advance from said spreading code shared among base stations;

subtracting said generated autocorrelation patterns from said correlation value profile; and searching for a next base station from the correlation value profile that has undergone said subtraction.

4. A cell search method of performing a base station search to identify spreading timings of a plurality of base stations located in the vicinity of a mobile station and spreading codes used by the base stations and differing for each base station, said method comprising steps of:

determining correlation values between received signals and a spreading code shared among base stations to determine a correlation value profile;

detecting peak values from said correlation value profile and peak timings at the time the peak values have been detected to detect spreading timings of base stations;

identifying spreading codes that differ for each base station and that are used by base stations for which spreading timings have been detected;

performing a path search process to detect peak timings at the time multipath occurs using the detected spreading timings and the spreading codes that differ for each base station and that have been identified;

subtracting peak values caused by multipath from said correlation value profile; and searching for a next base station from the correlation value profile that has undergone said subtraction.

5. A cell search method of performing a base station search to identify spreading timings of a plurality of base stations located in the vicinity of a mobile station and spreading codes used by the base stations and differing for each base station, said method comprising steps of:

determining correlation values between received signals and a spreading code shared among base stations to determine a correlation value profile;

detecting peak values from said correlation value profile and peak timings at the time the peak values have been detected to detect spreading timings of base stations;

identifying spreading codes that differ for each base station and that are used by base stations for which spreading timings have been detected;

performing a path search process to detect peak timings at the time multipath occurs using the detected spreading timings and the spreading codes that differ for each base station and that have been identified;

performing a process of masking said correlation value profile such that timings of an autocorrelation pattern with the center at the detected spreading timing and the timings of an autocorrelation pattern with the center at the peak timing at which a multipath is present are not subject to a cell search; and searching for a next base station from the correlation value profile that has undergone the masking process.

6. A method according to claim 5, wherein said step of performing a process of masking said correlation value profile includes a step of masking each of the timings that are the object of masking in chip units.

7. A method according to claim 5, wherein said step of performing a process of masking said correlation value profile includes a step of masking fixed regions in one or a plurality of locations that include timings that are the object of masking.

8. A cell search method of performing a base station search to identify spreading timings of a plurality of base stations located in the vicinity of a mobile station and spreading codes used by the base stations and differing for each base station, said method comprising steps of:

determining correlation values between received signals and a spreading code shared among base stations to determine a correlation value profile;

detecting peak values from said correlation value profile and peak timings at the time the peak values have been detected to detect spreading timings of base stations;

identifying spreading codes that differ for each base station and that are used by base stations for which spreading timings have been detected;

performing a path search process to detect peak timings at the time multipath occurs using the detected spreading timings and the spreading codes that differ for each base station and that have been identified;

performing a process of masking said correlation value profile such that timings of an autocorrelation pattern with the center at the detected spreading timing and peak timings at the time multipath occurs are not subject to a cell search; and searching for a next base station from the correlation value profile that has undergone the masking process.

9. A method according to claim 8, wherein said step of performing a process of masking said correlation value profile includes a step of masking each of the timings that are the object of masking in chip units.

10. A method according to claim 8, wherein said step of performing a process of masking said correlation value profile includes a step of masking fixed regions in one or a plurality of locations that include timings that are the object of masking.

11. A cell search method of performing a base station search to identify spreading timings of a plurality of base stations located in the vicinity of a mobile station and spreading codes used by the base stations and differing for each base station, said method comprising steps of:

determining correlation values between received signals and a spreading code shared among base stations to determine a correlation value profile;

detecting peak values from said correlation value profile and peak timings at the time the peak values have been detected to detect spreading timings of base stations;

identifying spreading codes that differ for each base station and that are used by base stations for which spreading timings have been detected;

performing a process of masking said correlation value profile such that timings of an autocorrelation pattern with the center at the detected spreading timing are not subject to a cell search; and searching for a next base station from the correlation value profile that has undergone the masking process.

12. A method according to claim 11, wherein said step of performing a process of masking said correlation value profile includes a step of masking each of the timings that are the object of masking in chip units.

13. A method according to claim 11, wherein said step of performing a process of masking said correlation value profile includes a step of masking fixed regions in one or a plurality of locations that include timings that are the object of masking.

14. A cell search method of performing a base station search to identify spreading timings of a plurality of base stations located in the vicinity of a mobile station and spreading codes used by the base stations and differing for each base station, said method comprising steps of:

determining correlation values between received signals and a spreading code shared among base stations to determine a correlation value profile;

detecting peak values from said correlation value profile and peak timings at the time the peak values have been detected to detect spreading timings of base stations;

identifying spreading codes that differ for each base station and that are used by base stations for which spreading timings have been detected;

performing a path search process to detect peak timings at the time multipath occurs using the detected spreading timings and the spreading codes that differ for each base station and that have been identified;

performing a process of masking said correlation value profile such that timings of an autocorrelation pattern with the center at the peak timing at which a multipath is present are not subject to a cell search; and searching for a next base station from the correlation value profile that has undergone the masking process.

15. A method according to claim 14, wherein said step of performing a process of masking said correlation value profile includes a step of masking each of the timings that are the object of masking in chip units.

16. A method according to claim 14, wherein said step of performing a process of masking said correlation value profile includes a step of masking fixed regions in one or a plurality of locations that include timings that are the object of masking.

17. A cell search method of performing a base station search to identify spreading timings of a plurality of base stations located in the vicinity of a mobile station and spreading codes used by the base stations and differing for each base station, said method comprising steps of:

determining correlation values between received signals and a spreading code shared among base stations to determine a correlation value profile;

detecting peak values from said correlation value profile and peak timings at the time the peak values have been detected to detect spreading timings of base stations;

identifying spreading codes that differ for each base station and that are used by base stations for which spreading timings have been detected;

performing a path search process to detect peak timings at the time multipath occurs using the detected spreading timings and the spreading codes that differ for each base station and that have been identified;

performing a process of masking said correlation value profile such that peak timings at the time multipath occurs are not subject to a cell search; and searching for a next base station from the correlation value profile that has undergone the masking process.

18. A method according to claim 17, wherein said step of performing a process of masking said correlation value profile includes a step of masking each of the timings that are the object of masking in chip units.

19. A method according to claim 17, wherein said step of performing a process of masking said correlation value profile includes a step of masking fixed regions in one or a plurality of locations that include timings that are the object of masking.

20. A cell search device for performing a base station search to identify spreading timings of a plurality of base stations located in the vicinity of a mobile station and spreading codes used by the base stations and differing for each base station, said device comprising:

a correlator for detecting correlation values between received signals and a spreading code shared among base stations to determine a correlation value profile;

peak detection means for detecting peak values from said correlation value profile and peak timings at which the peak values have been detected to successively detect spreading timings of base stations;

means for identifying spreading codes that differ for each base station and that are used by said base stations for which spreading timings have been detected;

means for performing a path search process to detect peak timings at the time multipath occurs using spreading timings that have been detected and said spreading codes that differ for each base station and that have been identified; and subtraction means for, based on an autocorrelation pattern that has been found in advance by means of a spreading code shared among said base stations, generating autocorrelation patterns that center on spreading timings of base stations that have been detected and autocorrelation patterns with the center at a peak timings at the time multipath occurs, and that performs a process for subtracting each of said generated autocorrelation patterns from said correlation value profile.

21. A cell search device for performing a base station search to identify spreading timings of a plurality of base stations located in the vicinity of a mobile station and spreading codes used by the base stations and differing for each base station, said device comprising:
   a correlator for detecting correlation values between received signals and a spreading code shared among base stations to determine a correlation value profile;
   peak detection means for detecting peak values from said correlation value profile and peak timings at which the peak values have been detected to successively detect spreading timings of base stations;
   means for identifying spreading codes that differ for each base station and that are used by said base stations for which spreading timings have been detected;
   means for performing a path search process to detect peak timings at the time multipath occurs using spreading timings that have been detected and said spreading codes that differ for each base station that have been identified; and
   subtraction means that, based on an autocorrelation pattern that has been found in advance by means of a spreading code shared among said base stations, generating autocorrelation patterns that center on spreading timings of base stations that have been detected and that performs a process for subtracting said generating autocorrelation patterns and peak values that are caused by multipath from said correlation value profile.

22. A cell search device for performing a base station search to identify spreading timings of a plurality of base stations located in the vicinity of a mobile station and spreading codes used by the base stations and differing for each base station, said device comprising:
   a correlator for detecting correlation values between received signals and a spreading code shared among base stations to determine a correlation value profile;
   peak detection means for detecting peak values from said correlation value profile and peak timings at which the peak values have been detected to successively detect spreading timings of base stations;
   a means for identifying spreading codes that differ for each base station and that are used by said base stations for which spreading timings have been detected;
   means for performing a path search process to detect peak timings at the time multipath occurs using spreading timings that have been detected and said spreading codes that differ for each base station that have been identified; and
   subtraction means that, based on an autocorrelation pattern that has been found in advance by means of a spreading code shared among said base stations, generating autocorrelation patterns with the center at a peak timings at the time multipath occurs and that performs a process for subtracting said generated autocorrelation patterns from said correlation value profile.

23. A cell search device for performing a base station search to identify spreading timings of a plurality of base stations located in the vicinity of a mobile station and spreading codes used by the base stations and differing for each base station, said device comprising:
   a correlator for detecting correlation values between received signals and a spreading code shared among base stations to determine a correlation value profile;
   peak detection means for detecting peak values from said correlation value profile and peak timings at which the peak values have been detected to successively detect spreading timings of base stations;
   a means for identifying spreading codes that differ for each base station and that are used by said base stations for which spreading timings have been detected;
   means for performing a path search process to detect peak timings at the time multipath occurs using spreading timings that have been detected and said spreading codes that differ for each base station that have been identified; and
   subtraction means that performs a process for subtracting peak values that are caused by multipath from said correlation value profile.

24. A cell search device for performing a base station search to identify spreading timings of a plurality of base stations located in the vicinity of a mobile station and spreading codes used by the base stations and differing for each base station, said device comprising:
   correlator for detecting correlation values between received signals and a spreading code shared among base stations to determine a correlation value profile;
   peak detection means for detecting peak values from said correlation value profile and peak timings at which the peak values have been detected to successively detect spreading timings of base stations;
   means for identifying spreading codes that differ for each base station and that are used by said base stations for which spreading timings have been detected;
   means for performing a path search process to detect peak timings at the time multipath occurs using spreading timings that have been detected and said spreading codes that differ for each base station that have been identified; and
   mask processing means that performs a process of masking said correlation value profile such that the timings of autocorrelation patterns that center on the spreading timings that have been detected and the timings of autocorrelation patterns with the center at a peak timings at the time multipath occurs are not the targets of a cell search.

25. A device according to claim 24, wherein said mask processing means masks each of the timings that are the object of masking in chip units.

26. A device according to claim 24, wherein said mask processing means masks fixed areas in one or a plurality of locations that include timings that are the object of masking.

27. A cell search device for performing a base station search to identify spreading timings of a plurality of base stations located in the vicinity of a mobile station and spreading codes used by the base stations and differing for each base station, said device comprising:
   a correlator for detecting correlation values between received signals and a spreading code shared among base stations to determine a correlation value profile;
   peak detection means for detecting peak values from said correlation value profile and peak timings at which the peak values have been detected to successively detect spreading timings of base stations;

a means for identifying spreading codes that differ for each base station and that are used by said base stations for which spreading timings have been detected;

means for performing a path search process to detect peak timings at the time multipath occurs using spreading timings that have been detected and said spreading codes that differ for each base station that have been identified; and mask processing means that performs a process of masking said correlation value profile such that the timings of autocorrelation patterns that center on the spreading timings that have been detected and peak timings at the time multipath occurs are not the targets of a cell search.

28. A device according to claim 27, wherein said mask processing means masks each of the timings that are the object of masking in chip units.

29. A device according to claim 27, wherein said mask processing means masks fixed areas in one or a plurality of locations that include timings that are the object of masking.

30. A cell search device for performing a base station search to identify spreading timings of a plurality of base stations located in the vicinity of a mobile station and spreading codes used by the base stations and differing for each base station, said device comprising:

a correlator for detecting correlation values between received signals and a spreading code shared among base stations to determine a correlation value profile;

peak detection means for detecting peak values from said correlation value profile and peak timings at which the peak values have been detected to successively detect spreading timings of base stations;

means for identifying spreading codes that differ for each base station and that are used by said base stations for which spreading timings have been detected;

mask processing means that performs a process of masking said correlation value profile such that the timings of autocorrelation patterns that center on the spreading timings that have been detected are not the targets of a cell search.

31. A device according to claim 30, wherein said mask processing means masks each of the timings that are the object of masking in chip units.

32. A device according to claim 30, wherein said mask processing means masks fixed areas in one or a plurality of locations that include timings that are the object of masking.

33. A cell search device for performing a base station search to identify spreading timings of a plurality of base stations located in the vicinity of a mobile station and spreading codes used by the base stations and differing for each base station, said device comprising:

a correlator for detecting correlation values between received signals and a spreading code shared among base stations to determine a correlation value profile;

peak detection means for detecting peak values from said correlation value profile and peak timings at which the peak values have been detected to successively detect spreading timings of base stations;

means for identifying spreading codes that differ for each base station and that are used by said base stations for which spreading timings have been detected;

means for performing a path search process to detect peak timings at the time multipath occurs using spreading timings that have been detected and said spreading codes that differ for each base station that have been identified; and mask processing means that performs a process of masking said correlation value profile such that the timings of autocorrelation patterns with the center at a peak timings at the time multipath occurs are not the targets of a cell search.

34. A device according to claim 33, wherein said mask processing means masks each of the timings that are the object of masking in chip units.

35. A device according to claim 33, wherein said mask processing means masks fixed areas in one or a plurality of locations that include timings that are the object of masking.

36. A cell search device for performing a base station search to identify spreading timings of a plurality of base stations located in the vicinity of a mobile station and spreading codes used by the base stations and differing for each base station, said device comprising:

a correlator for detecting correlation values between received signals and a spreading code shared among base stations to determine a correlation value profile;

peak detection means for detecting peak values from said correlation value profile and peak timings at which the peak values have been detected to successively detect spreading timings of base stations;

a means for identifying spreading codes that differ for each base station and that are used by said base stations for which spreading timings have been detected;

means for performing a path search process to detect peak timings at the time multipath occurs using spreading timings that have been detected and said spreading codes that differ for each base station that have been identified; and mask processing means that performs a process of masking said correlation value profile such that the peak timings at the time multipath occurs are not the targets of a cell search.

37. A device according to claim 36, wherein said mask processing means masks each of the timings that are the object of masking in chip units.

38. A device according to claim 36, wherein said mask processing means masks fixed areas in one or a plurality of locations that include timings that are the object of masking.

39. A cell search method of performing a base station search to identify spreading timings of a plurality of base stations located in the vicinity of a mobile station and spreading codes used by the base stations and differing for each base station, said method comprising steps of:

determining correlation values between received signals and a spreading code shared among base stations to determine a correlation value profile;

detecting peak values from said correlation value profile and peak timings at the time the peak values have been detected to detect spreading timings of base stations;

identifying spreading codes that differ for each base station and that are used by base stations for which spreading timings have been detected;

performing a path search process to detect peak timings at the time multipath occurs using the detected spreading timings and the spreading codes that differ for each base station and that have been identified; and generating autocorrelation patterns with the center at a peak timings timing at the time multipath occurs, based on an autocorrelation pattern that has been found in advance from said spreading code shared among base stations.

* * * * *